United States Patent
Seong et al.

(10) Patent No.: US 11,812,524 B2
(45) Date of Patent: Nov. 7, 2023

(54) HEATING FILM AND METHOD FOR MANUFACTURING SAME

(71) Applicant: LG CHEM, LTD., Seoul (KR)

(72) Inventors: Jiehyun Seong, Daejeon (KR); Jung Il Yoon, Daejeon (KR); Sang Hoon Son, Daejeon (KR); Kiseok Lee, Daejeon (KR); Yong Goo Son, Daejeon (KR); Jooyeon Kim, Daejeon (KR); Jong Sung Park, Daejeon (KR); Seung Heon Lee, Daejeon (KR)

(73) Assignee: LG CHEM, LTD., Seoul (KR)

(*) Notice: Subject to any disclaimer, the term of this patent is extended or adjusted under 35 U.S.C. 154(b) by 358 days.

(21) Appl. No.: 16/650,312

(22) PCT Filed: Dec. 5, 2018

(86) PCT No.: PCT/KR2018/015313
§ 371 (c)(1),
(2) Date: Mar. 24, 2020

(87) PCT Pub. No.: WO2019/112316
PCT Pub. Date: Jun. 13, 2019

(65) Prior Publication Data
US 2020/0281047 A1 Sep. 3, 2020

(30) Foreign Application Priority Data

Dec. 8, 2017 (KR) .................... 10-2017-0168349
Nov. 22, 2018 (KR) .................... 10-2018-0145328

(51) Int. Cl.
*H05B 3/86* (2006.01)
*B32B 15/20* (2006.01)
(Continued)

(52) U.S. Cl.
CPC .............. *H05B 3/86* (2013.01); *B32B 15/09* (2013.01); *B32B 15/20* (2013.01);
(Continued)

(58) Field of Classification Search
None
See application file for complete search history.

(56) References Cited

U.S. PATENT DOCUMENTS 5,418,025 A    5/1995 Harmand et al.
2011/0266275 A1* 11/2011 Rateiczak ............... H05B 3/86
                                              427/532
(Continued)

FOREIGN PATENT DOCUMENTS

CN     1791307 A      6/2006
CN     206294357 U    6/2017
(Continued)

OTHER PUBLICATIONS

Suetsugu—JP 2017-201606 A—ISR D2—MT—heat film w—refractive index—Nov. 2017 (Year: 2017).*
(Continued)

*Primary Examiner* — John Vincent Lawler
(74) *Attorney, Agent, or Firm* — Bryan Cave Leighton Paisner LLP

(57) ABSTRACT

The heating film including: a transparent substrate; a coating layer provided on the transparent substrate and having a refractive index of 1.450 to 1.485; and a metal foil pattern provided on the coating layer, in which a ten-point average roughness (Rz) of a surface of the metal foil pattern is more than 0.9 μm.

22 Claims, 4 Drawing Sheets

(51) Int. Cl.
*B32B 27/36* (2006.01)
*B32B 37/02* (2006.01)
*B32B 37/24* (2006.01)
*B32B 15/09* (2006.01)
*B32B 17/10* (2006.01)
*H05B 3/36* (2006.01)

(52) U.S. Cl.
CPC .. *B32B 17/10036* (2013.01); *B32B 17/10385* (2013.01); *B32B 17/10761* (2013.01); *B32B 27/36* (2013.01); *B32B 37/02* (2013.01); *B32B 37/24* (2013.01); *H05B 3/36* (2013.01); *B32B 2037/243* (2013.01); *B32B 2250/40* (2013.01); *B32B 2255/06* (2013.01); *B32B 2255/26* (2013.01); *B32B 2311/12* (2013.01); *B32B 2329/06* (2013.01); *B32B 2367/00* (2013.01); *B32B 2605/006* (2013.01); *H05B 2203/002* (2013.01)

(56) References Cited

U.S. PATENT DOCUMENTS

| | | | | |
|---|---|---|---|---|
| 2012/0261404 | A1* | 10/2012 | Choi | H05B 3/86 29/613 |
| 2013/0292373 | A1 | 11/2013 | Choi et al. | |
| 2015/0334824 | A1* | 11/2015 | Fix | G06F 3/041 264/479 |
| 2016/0278166 | A1* | 9/2016 | Seong | H05B 3/26 |
| 2016/0311402 | A1* | 10/2016 | Suetsugu | B60S 1/026 |
| 2018/0355485 | A1* | 12/2018 | De Buysser | C08J 7/046 |
| 2019/0080820 | A1 | 3/2019 | Myung et al. | |
| 2020/0296804 | A1 | 9/2020 | Myung | |

FOREIGN PATENT DOCUMENTS

| | | | | |
|---|---|---|---|---|
| EP | 2521422 | A2 * | 11/2012 | H01C 17/02 |
| GB | 1205271 | * | 9/1970 | B32B 33/00 |
| GB | 2010650 | A | 6/1979 | |
| JP | 06140134 | A | 5/1994 | |
| JP | H06/140134 | * | 5/1994 | F24D 13/02 |
| JP | 2788294 | A | 6/1998 | |
| JP | 2008/077879 | * | 4/2008 | H05B 3/10 |
| JP | 2008077879 | A | 4/2008 | |
| JP | 2012-506112 | A | 3/2012 | |
| JP | 2013516043 | A | 5/2013 | |
| JP | 2016/120894 | * | 7/2016 | B60S 1/02 |
| JP | 2016-120894 | A | 7/2016 | |
| JP | 2016-141210 | A | 8/2016 | |
| JP | 2016146334 | A | 8/2016 | |
| JP | 2017/095331 | * | 6/2017 | B32B 7/02 |
| JP | 2017-095331 | A | 6/2017 | |
| JP | 2017/201606 | * | 11/2017 | H01C 17/02 |
| JP | 2017-201606 | A | 11/2017 | |
| KR | 10-2010-0091499 | A | 8/2010 | |
| KR | 10-2011-0076837 | A | 7/2011 | |
| KR | 10-2014-0094344 | A | 7/2014 | |
| KR | 10-2014-0140741 | A | 12/2014 | |
| KR | 10-2016-0061944 | A | 6/2016 | |
| WO | 2017/188553 | A1 | 11/2017 | |
| WO | 2017/188554 | A1 | 11/2017 | |

OTHER PUBLICATIONS

Tanooka—JP H06-140134 A—Jap. D7—MT—heating element—1994 (Year: 1994).*
Kuriki—JP 2008-077879 A—Jap. D3—MT—transparent flexible film heater—2008 (Year: 2008).*
Okawa—JP 2016-120894 A—Euro.Pat. D3 +Jap. D2 + CN D1—MT—heating plate & vehicle—2016 (Year: 2016).*
Nakajima—JP 2017-095331 A—IDS—MT—interlayer w—conductive layer+roughness—2017 (Year: 2017).*
Polymer Database—Refractive Index—amorphous polymers—Jul. 12, 2022 (Year: 2022).*
MatWeb—Ethylene Vinyl Acetate Copolymer (EVA), Film Grade—Jul. 12, 2022 (Year: 2022).*
Polymer Database—Glass Transition Temperatures—Jul. 14, 2022 (Year: 2022).*
Rani—thin films & structures of niobium pentoxide—prop & applications—J.Mater.Chem. A—2014 (Year: 2014).*
Japanese Office Action of Japanese Patent Office in Appl'n No. 2020-517299, dated Jun. 13, 2022.

* cited by examiner

[Figure 1]
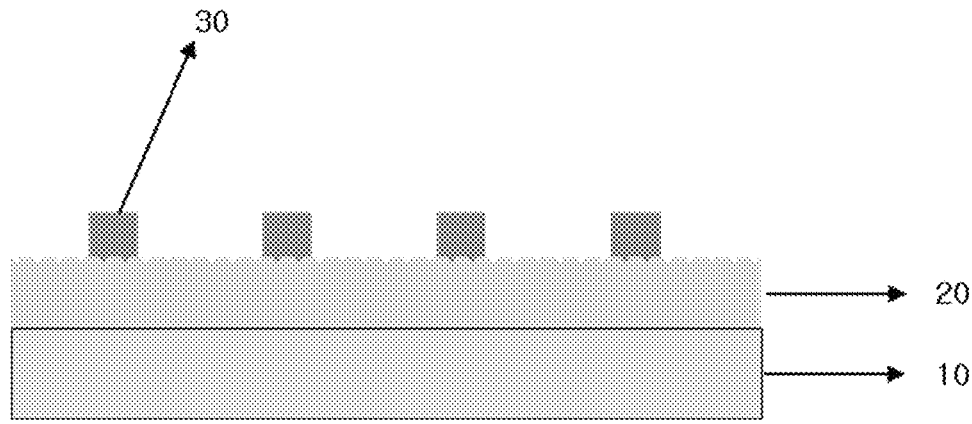
[Figure 2]
| Copper Foil Thickness | 3um | 8um | 8um |
|---|---|---|---|
| OM Image | | | |
| Pattern Pitch (um) | ~346 | ~831 | ~1074 (Horizontal Direction) |
| Line Width (um) | 15.8 | 15.5 | 13.5 |
| Sheet Resistance (ohm/sq) | 0.241 | 0.243 | 0.239 |
| Total Transmittance (Tt/%) | 86.25 ± 0.05 | 87.93 ± 0.03 | 87.89 ± 0.13 |
| Haze (H, %) | 1.32 ± 0.13 | 1.07 ± 0.12 | 1.12 ± 0.05 |
| Transmission Mode YI | 2.54 ± 0.09 | 2.42 ± 0.04 | 2.43 ± 0.05 |
| Average Reflectance (%) | 13.48 / 12.72 | 13.65 / 13.73 | 13.25 / 12.66 |
| Reflectance Mode YI (Front/Rear) | 5.27 / 4.58 | 0.48 / 0.47 | 1.61 / -0.18 |

[Figure 3]

| Classification | | Line Width 11um(Rs=0.21Ω/□) | | Line Width 7um(Rs=0.34Ω/□) | |
|---|---|---|---|---|---|
| | | Front Surface | Rear Surface | Front Surface | Rear Surface |
| OM image (×10) | | | | | |
| OM image (×10) | | | | | |
| Transmission | Transmittance (%) | 83.24 | 83.38 | 85.01 | 85.20 |
| | Haze (%) | 0.90 | 0.82 | 1.26 | 0.95 |
| Reflection | Reflectance (%) | 7.11 | 5.87 | 7.19 | 5.96 |
| | b* | 2.14 | -1.21 | 2.07 | -1.29 |
| | YI | 13.42 | -5.89 | 13.02 | -6.08 |

[Figure 4]

| Classification | | Bare | | Blackening 30 sec | |
|---|---|---|---|---|---|
| | | Front Surface | Rear Surface | Front Surface | Rear Surface |
| Microscope Image (×800) | | | | | |
| Transmission | T (%) | 86.17 | | 86.72 | |
| | H (%) | 1.22 | | 1.20 | |
| Reflection | R (%) | 6.47 | 4.87 | 5.25 | 5.21 |
| | YI | -0.62 | -5.55 | -11.54 | -6.18 |

[Figure 5]
| Classification | Before Lamination of PVB (Film) | | After Lamination PVB (Glass) | |
|---|---|---|---|---|
| | Etching | Strip | Etching | Strip |
| OM (×5) | | | | |
| OM (×50) | | | | |
| Transmittance (%) | 85.40 | 85.82 | 84.54 | 84.28 |
| Haze (%) | 34.27 | 44.12 | 2.42 | 3.54 |
| b* | 0.31 | -0.14 | 1.70 | 2.06 |
| YI | 0.67 | -0.16 | 3.06 | 3.42 |
[Figure 6]
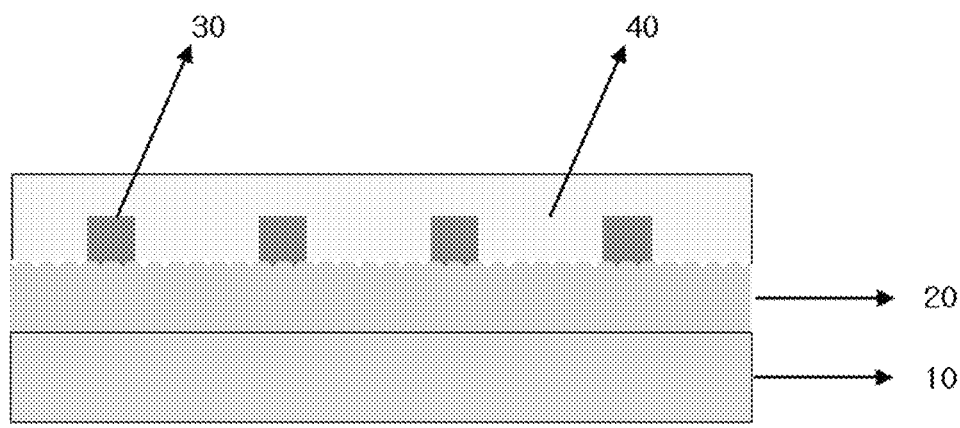

[Figure 7]
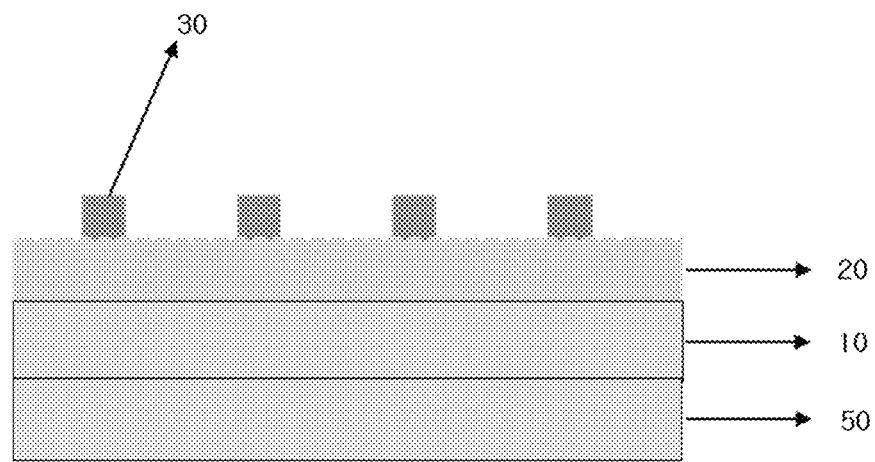
[Figure 8]
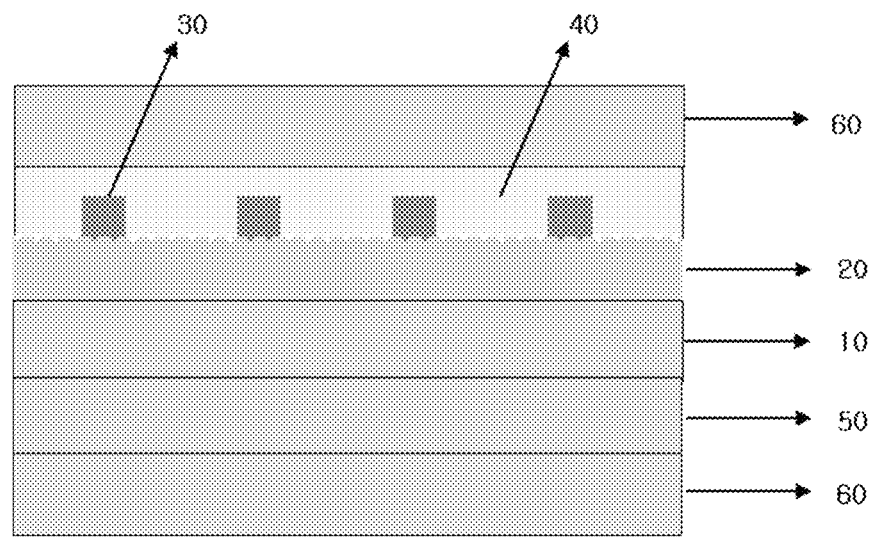

HEATING FILM AND METHOD FOR MANUFACTURING SAME

CROSS-REFERENCE TO RELATED APPLICATIONS

This application is a U.S. national stage of international Application No. PCT/KR2018/015313 filed Dec. 5, 2018, and claims priority to and the benefit of Korean Patent Application Nos. 10-2017-0168349 filed Dec. 8, 2017, and 10-2018-0145328 filed Nov. 22, 2018, the entire contents of which are incorporated by reference as if fully set forth herein.

TECHNICAL FIELD

The present application relates to a heating film and a method for manufacturing the same.

BACKGROUND

When there is a difference between the external temperature and the internal temperature of an automobile, moisture or frost occurs on the automobile glass. Heating glass may be used to solve this problem. Heating glass is used as a concept of attaching a hot wire sheet to the surface of glass or directly forming hot wires on the surface of glass, generating heat from the hot wires by applying electricity at both terminals of the hot wire, thereby increasing the temperature of the surface of glass.

In particular, there are largely two methods which are adopted to impart an excellent optical performance and a heat generation function to an automotive windshield.

The first method is to form a transparent conductive thin film on the front surface of glass. Examples of a method of forming a transparent conductive thin film comprise a method of enhancing transparency by using a transparent conductive oxide film such as ITO or forming a thin metal layer, and then using a transparent insulation film above and below the metal layer. When this method is used, there is an advantage in that an optically excellent conductive film may be formed, but there is a disadvantage in that an appropriate heating value may not be realized at low voltage due to the relatively high resistance value.

The second method may form a metal pattern on a PET film through a printing process, or may form a metal pattern through a photolithography and etching process after forming a metal layer on the PET film. A heating product having a heating function may be produced by inserting the PET film on which the metal pattern is formed between two PVB films, and subjecting the PET film to a glass bonding process. However, in the case of a method of forming a metal layer on the PET film, and then etching the metal layer, when the thickness of the metal is increased, the metal layer needs to be formed by a method such as plating after a seed layer is deposited, and as a result, there is a disadvantage in that the price of the heating product is very high. Moreover, the metal layer brought into contact with the PET surface is a metal layer formed by a thin-film seed layer and a sputter, but since the metal layer smoothly shines due to the low surface roughness, the metal layer has reflectivity specific to metal even though the metal layer is transparent when seen from the PET surface after patterning, so that the pattern is easily recognized. When the metal foil is bonded to PET with a bonding agent and then patterned, the fabric's unit price may be lowered. However, in this case, the bonding force needs to be excellent in order to be stable against etching, so that when the bonding agent is completely cured, the roughness corresponding to the surface roughness specific to the metal foil is generated on the surface of the bonding agent, so that there is a disadvantage in that the hazes of the film and the bonding glass are increased. Further, the addition of a layer other than PET and metal which are essential elements complicates the structure, and may affect physical properties of the final laminated glass.

SUMMARY

The present specification describes a heating film and a method for manufacturing the same.

An exemplary embodiment of the present application provides a heating film comprising:
  a transparent substrate;
  a coating layer provided on the transparent substrate and having a refractive index of 1.450 to 1.485; and
  a metal foil pattern provided on the coating layer,
  in which a ten-point average roughness (Rz) of a surface of the metal foil pattern, which is brought into contact with the coating layer, is more than 0.9 μm.

Further, another exemplary embodiment of the present application provides a method for manufacturing a heating film, the method comprising:
  forming a coating layer having a refractive index of 1.450 to 1.485 on a metal foil film;
  forming a transparent substrate on the coating layer; and
  forming a metal foil pattern by patterning the metal foil film,
  in which a ten-point average roughness (Rz) of a surface of the metal foil pattern, which is brought into contact with the coating layer, is more than 0.9 μm.

In addition, still another exemplary embodiment of the present application provides an automotive heating glass comprising:
  the heating film;
  a first glass provided on one surface of the heating film; and
  a second glass provided on the other surface of the heating film,
  in which at least one surface of a surface between the heating film and the first glass and a surface between the heating film and the second glass comprises a second laminated film.

According to an exemplary embodiment of the present application, a metal foil film is patterned after a coating layer is formed by using the metal foil film as a substrate without forming a metal pattern by an expensive deposition process as in the related art, so that a heating film may be manufactured at a low cost.

Further, an automotive heating glass according to an exemplary embodiment of the present application may minimize a difference between refractive indices of a laminated film provided on both surfaces of a heating film and a coating layer provided to be brought into contact with a metal foil pattern, so that image distortion caused by the heating glass may be minimized.

In addition, for the automotive heating glass according to an exemplary embodiment of the present application, the reflectance of at least one surface thereof is low, so that the metal foil pattern may not be easily recognized.

BRIEF DESCRIPTION OF DRAWINGS

FIG. 1 is a schematic illustration of a heating film according to an exemplary embodiment.

FIG. 2 is a table listing the characteristics of an automotive heating glass according to Example 1.

FIG. 3 is a table listing the characteristics of an automotive heating glass according to Example 2.

FIG. 4 is a table listing the characteristics of an automotive heating glass according to Example 3.

FIG. 5 is a table listing the characteristics of an automotive heating glass according to Comparative Example 1.

FIGS. 6 and 7 each are schematic illustrations of a heating film according to an exemplary embodiment.

FIG. 8 is a schematic illustration of an automotive heating glass according to an exemplary embodiment 1.

REFERENCE NUMERALS AND SYMBOLS USED HEREIN

10: Transparent substrate
20: Coating layer
30: Metal foil pattern
40: Protective layer
50: Laminated film
60: Glass

DETAILED DESCRIPTION

Hereinafter, the present invention will be described in more detail.

Resistance heating was used to remove frost of an automotive in the related art by inserting metal wires into a PVB film which is an intermediate layer for laminated glass. However, the metal wires were visually recognized by the unaided eye, which deteriorated the quality of the glass.

Alternatively, application of a metal mesh film has been developed by depositing or plating copper to a thickness of 2 μm to 3 μm onto PET, and then patterning the copper, but high costs are generated because the process requires deposition of copper for preparing a metal mesh film. In addition, at least one surface of a metal film comprising a deposition process has a high reflectance without any separate process, and as a result, a metal mesh film prepared therefrom also has a high reflectance, so that the pattern is easily recognized.

In order to reduce costs, a method of using fabric in which a metal foil such as a copper foil or an aluminum foil is attached to a transparent substrate by using a bonding agent can also be considered. However, a completely curable bonding agent is generally used because the metal foil needs to be attached firmly to the transparent substrate. When the metal foil is attached to the transparent substrate by the completely curable bonding agent, the bonding agent is cured in a state where the irregularities of the metal foil are reflected on the surface of the bonding agent, and the irregularities remain as they are even though the metal is removed by etching. Thus, the haze increases and the appearance quality of the product deteriorates.

The present application provides a heating film which may be manufactured at a low cost, has a pattern which is not easily seen, and may improve light characteristics due to the low haze after glass is laminated, and a method for manufacturing the same.

The heating film according to an exemplary embodiment of the present application comprises: a transparent substrate; a coating layer provided on the transparent substrate and having a refractive index of 1.450 to 1.485; and a metal foil pattern provided on the coating layer, in which a ten-point average roughness (Rz) of a surface of the metal foil pattern, which is brought into contact with the coating layer, is more than 0.9 μm.

In the present application, as the transparent substrate, a film having a visible light transmittance of 80% or more, such as polyethylene terephthalate (PET), a cyclic olefin polymer (COP), polyethylene naphthalate (PEN), polyethersulfone (PES), polycarbonate (PC), and acetyl celluloid is preferred. In particular, as the transparent substrate, PET is more preferred. A thickness of the transparent substrate may be 25 μm to 100 μm, but is not limited thereto.

The transparent substrate may further comprise an attachment enhancement layer having a thickness of 1 nm to 5 nm on one surface or both surfaces of the transparent substrate in order to impart adhesion force with a coating layer provided on the transparent substrate. The attachment enhancement layer may be formed by a deposition process or a solution coating process. The attachment enhancement layer may comprise one or more of niobium oxide, silicon oxide, tin oxide, titanium oxide, aluminum oxide, and the like, but the oxide is not limited thereto.

In this case, the niobium oxide may comprise one or more materials in which a ratio of the number of Nb atoms to the number of O atoms is 1 to 2.5. Specific examples of the niobium oxide comprise $NbO$, $NbO_2$, $Nb_2O_5$, $NbsO_{19}$, $Nb_{16}O_{38}$, $Nb_{12}O_{29}$, $Nb_{47}O_{116}$, and the like. Further, the silicon oxide may comprise one or more materials in which a ratio of the number of Si atoms to the number of O atoms is 1 to 2. Specific examples of the silicon oxide comprise $SiO_2$, $SiO$, and the like. In addition, the tin oxide may comprise one or more materials in which a ratio of the number of Sn atoms to the number of O atoms is 1 to 2. Specific examples of the tin oxide comprise $SnO_2$, $SnO$, and the like. Furthermore, the titanium oxide may comprise one or more materials in which a ratio of the number of Ti atoms to the number of O atoms is 0.3 to 2. Specific examples of the material comprise $TiO_2$, $TiO$, $Ti_2O_3$, $Ti_3O$, $Ti_2O$, and the like. Further, the aluminum oxide comprises $Al_2O_3$.

In addition, another functional coating layer may also be formed on the transparent substrate within the limitation of maintaining transparency of the film. Furthermore, an amine-based or epoxy-based primer coating may also be formed on the transparent substrate.

In the present application, the coating layer is provided on a transparent substrate and has a refractive index of 1.450 to 1.485. It is more preferred that the coating layer has a refractive index of 1.465 to 1.485.

In the present application, the refractive index of a coating layer, a protective layer, a laminated film, or the like can be measured by a prism coupler (an example of a device—2010/M manufactured by Metricon Corporation), an ellipsometer (an example of a device—UVISEL manufactured by Horiba Scientific, Ltd.), an Abbe refractometer (an example of a device—AR4 manufactured by KRUSS GmbH), and the like.

In general, an automotive windshield is manufactured by inserting a laminated film between two sheet glasses and laminating the laminated film at high temperature and high pressure. In this case, as the laminated film, polyvinyl butyral (PVB), ethyl vinyl acetate (EVA), and the like are usually used, these materials have a refractive index of 1.45 to 1.49, and most of the materials have a refractive index of 1.47 to 1.48. After the lamination of glass, the haze may be reduced when the refractive indices of the coating layer/the laminated film are the same as or slightly different from each other, so that it is preferred that the refractive index of the coating layer is adjusted to 1.450 to 1.485. When there is a great difference between the refractive index of the coating layer and the refractive index of the laminated film, the heating film has a high haze by internal scattering while light passes through glass, and the greater the irregularities of the coating layer are, the higher the haze is.

Further, the coating layer may have a thickness of 3 μm to 15 μm, 3 μm to 7 μm, and 7 μm to 15 μm. In addition, the coating layer may have a thickness of 5 μm to 7 μm. When the coating layer has a thickness of less than 3 μm, the adhesion force with the transparent substrate is not sufficient, and it is difficult to uniformly coat the entire area of a metal foil having great irregularities. When the coating layer has a thickness of more than 15 μm, a material for the coating layer is unnecessarily consumed and it is difficult to dry the solvent, so that it is difficult to stably prepare a thick coating layer on a relatively thin copper foil as compared to the coating layer. Further, after a heating film is manufactured, when a laminated film and glass are stacked on both surfaces of the heating film and laminated at high temperature/high pressure, a metal foil pattern may be deformed, so that tension or disconnection may occur.

In addition, the coating layer may comprise one or more of polyvinyl butyral (PVB), ethylene vinyl acetate (EVA), and acrylate-based adhesive materials. In particular, it is more preferred that the coating layer comprises polyvinyl butyral (PVB).

The coating layer may have a glass transition temperature (Tg) of 25° C. to 80° C. When the coating layer has a glass transition temperature of less than 25° C., it is difficult to stably store a manufactured heating film at room temperature. Furthermore, when a heating film is laminated with a laminated film and glass by stacking the laminated film and the glass at high temperature/high pressure, the fluidity becomes greater if the glass transition temperature of the coating layer is low, so that the metal foil pattern is deformed, and as a result, tension occurs or the heating film is more vulnerable to disconnection. When the coating layer has a glass transition temperature of more than 80° C., it is difficult to laminate the coating layer with a transparent substrate by heat.

In the present application, the metal foil pattern is provided on a coating layer, and a ten-point average roughness (Rz) of a surface of the metal foil pattern, which is brought into contact with the coating layer, is more than 0.9 μm. The ten-point average roughness (Rz) of a surface of the metal foil pattern, which is brought into contact with the coating layer, may be more than 0.9 μm and less than 3.0 μm. Further, a ten-point average roughness (Rz) of an entire surface of the coating layer opposite to a surface on which the transparent substrate is provided may be more than 0.9 μm and less than 3.0 μm.

When the Rz is 0.9 μm or less, the heating film has a high reflectance specific to the metal foil due to the low irregularities. Accordingly, since it is difficult to lower the reflectance of a heating film and a heating glass manufactured therefrom, there is a disadvantage in that the pattern is easily recognized by the eye by the high reflectance.

The metal foil pattern may have a height of 2 μm to 15 μm, and the metal foil pattern may comprise an aluminum foil pattern or copper foil pattern. In this case, the height of the metal foil pattern can be measured by a micrometer or a thickness gauge.

The metal foil pattern may be manufactured from a metal foil comprising at least one matt surface having a relatively high ten-point average roughness (Rz). In this case, the matt surface of the metal foil is brought into contact with the coating layer.

In the present application, a reflectance of the metal foil measured at a wavelength of 380 nm to 780 nm on a matt surface having a relatively high ten-point average roughness (Rz) may be 67% or less, preferably 50% or less. In addition, the metal foil pattern may comprise an aluminum foil pattern or copper foil pattern having an average reflectance of 15% or less at a wavelength of 380 nm to 780 nm.

The reflectance may be measured by an apparatus such as UV-3600 or Solidspec-3700 manufactured by Shimadzu Corporation, Japan.

The metal foil pattern may have a line width of 4 μm to 25 μm, a sheet resistance of 0.1 ohm/sq to 0.5 ohm/sq, and an opening ratio of 90% to 99%. The opening ratio means an upper area ratio of a coating layer in which a metal foil pattern is not provided, based on the entire upper area of the coating layer. Further, the total length of a line of a metal foil pattern comprised in a region of 25 cm² may be 2 m to 11 m.

An exemplary embodiment of the present application may further comprise a blackening layer pattern or a polymer resin layer pattern on the metal foil pattern. The blackening layer pattern may comprise one or more of chromium-based, selenium-based, copper sulfide-based, copper oxide-based, copper sulfide-based, aluminum oxynitride-based, copper oxynitride-based materials, and the like. The blackening layer pattern may be formed by wet-coating the above-described material on a metal foil pattern, or a material such as an aluminum oxynitride-based material and copper oxynitride-based material may be formed to a thickness of 30 nm to 70 nm by a sputtering process.

The polymer resin layer pattern may comprise an acrylate-based resin, a novolac resin, and the like, and may further comprise a black dye or pigment, and the like in order to improve the appearance. A thickness of the polymer resin layer pattern may be 100 to 500 nm, but is not limited thereto.

An exemplary embodiment of the present application, may further comprise a protective layer on the coating layer and the metal foil pattern, and a difference in refractive index between the coating layer and the protective layer may be 0.030 or less and 0 or more.

The protective layer may comprise a resin such as polyvinyl butyral (PVB), ethylene vinyl acetate (EVA), polyurethane (PU), and polyolefin (PO), but the resin is not limited thereto. In particular, it is preferred that the protective layer comprises polyvinyl butyral (PVB).

When the protective layer is further comprised on the coating layer and the metal foil pattern, advantages are as follows. When the line height of the metal foil pattern is increased, it is very difficult to attach a protective film due to the irregularities caused by a pattern. When a product is released without the protective layer, damage such as a surface scratch can occur. In this case, when a PVB coating layer formed of a material such as PVB applied to the laminated glass is introduced into the upper portion of a pattern surface, the metal surface may be protected from surface scratches. Further, even when scratches occur on the PVB coating layer, scratches may be removed by heat and pressure when glass is laminated.

A method of comprising the protective layer on the coating layer and the metal foil pattern is as follows. After a layer is formed to a thickness of 3 μm to 30 μm by coating a separate release film with a composition comprising the above-described material, the protective layer may be formed on the metal foil pattern by using a process of subjecting the release film to heat lamination at 70° C. to 130° C. In this case, the heat lamination process may be performed, except for a portion brought into contact with a bus bar. By heat staking due to the heat lamination process, the surface roughness of the coating layer having a refractive index of 1.450 to 1.485 may be decreased. As the release film, it is possible to use a film in which PET is coated with a silicone-based release layer or melamine-based release layer. The release film may be removed immediately after the heat lamination process, may be removed immediately before encapsulation between PVB sheets during the manufacture of an automotive heating glass, and may also be removed immediately before glass is laminated.

According to another exemplary embodiment of the present application, a first laminated film may be additionally comprised on a surface of the transparent substrate opposite to a surface on which a coating layer is provided, and a difference in refractive index between the coating layer and the first laminated film may be 0.030 or less, and may be 0 or more.

The first laminated film may comprise polyvinyl butyral (PVB), ethylene vinyl acetate (EVA), polyurethane (PU), polyolefin (PO), and the like, but the material is not limited thereto. In particular, it is preferred that the first laminated film comprises polyvinyl butyral (PVB).

In an exemplary embodiment of the present application, the coating layer and the protective layer may comprise the same material, and the coating layer and the first laminated film may comprise the same material. Accordingly, the coating layer and the protective layer may comprise polyvinyl butyral (PVB), and the coating layer and the first laminated film may comprise polyvinyl butyral (PVB).

After a layer is formed to a thickness of 3 μm to 30 μm by coating a separate release film with a composition comprising the above-described material, the protective layer may be formed by using a heat lamination process at 70° C. to 130° C. In this case, the heat lamination process may be performed, except for a portion brought into contact with a bus bar. By heat staking due to the heat lamination process, the surface roughness of the coating layer having a refractive index of 1.450 to 1.485 may be decreased.

As the release film, it is possible to use a film in which PET is coated with a silicone-based release layer or melamine-based release layer. The release film may be removed immediately after the heat lamination process, may be removed immediately before encapsulation between PVB sheets during the manufacture of an automotive heating glass, and may also be removed immediately before glass is laminated.

When the line height of the metal foil pattern is increased, it is very difficult to attach a protective film due to the irregularities caused by a pattern, so that when a product is released without any protective film, damage such as a surface scratch can occur. In this case, when a PVB coating layer formed of a material such as PVB applied to the laminated glass is formed on the upper portion of a pattern surface, the metal surface may be protected from surface scratches. Further, even when scratches occur on the PVB coating layer, scratches may be removed by heat and pressure when glass is laminated.

A heating film according to an exemplary embodiment of the present application is schematically illustrated in the following FIGS. 1, 6, and 7. As illustrated in the following FIG. 1, the heating film according to an exemplary embodiment of the present application comprises: a transparent substrate 10; a coating layer 20 provided on the transparent substrate 10 and having a refractive index of 1.450 to 1.485; and a metal foil pattern 30 provided on the coating layer 20, in which a ten-point average roughness (Rz) of at least one surface of the surfaces of the coating layer or the metal foil pattern 30, which is brought into contact with the coating layer 20, is more than 0.9 μm.

Further, as illustrated in the following FIG. 6, the heating film according to an exemplary embodiment of the present application further comprises a protective layer on the coating layer 20 and the metal foil pattern 30, and a difference in refractive index between the coating layer 20 and the protective layer 40 is 0.030 or less. In this case, the protective layer may comprise polyvinyl butyral (PVB), ethylene vinyl acetate (EVA), polyurethane (PU), polyolefin (PO), and the like, but the material is not limited thereto. In particular, it is preferred that the protective layer comprises polyvinyl butyral (PVB).

Further, as illustrated in the following FIG. 7, the heating film according to an exemplary embodiment of the present application further comprises a first laminated film 50 on a surface of the transparent substrate 10 opposite to a surface on which the coating layer 20 is provided, and a difference in refractive index between the coating layer 20 and the first laminated film 50 is 0.030 or less. In this case, the first laminated film may comprise polyvinyl butyral (PVB), ethylene vinyl acetate (EVA), polyurethane (PU), polyolefin (PO), and the like, but the material is not limited thereto. In particular, it is preferred that the first laminated film comprises polyvinyl butyral (PVB).

The method for manufacturing a heating film according to an exemplary embodiment of the present application comprises: forming a coating layer having a refractive index of 1.450 to 1.485 on a metal foil film; forming a transparent substrate on the coating layer; and forming a metal foil pattern by patterning the metal foil film, in which a ten-point average roughness (Rz) of a surface of the metal foil pattern, which is brought into contact with the coating layer, is more than 0.9 μm.

In the method for manufacturing a heating film according to an exemplary embodiment of the present application, the contents on the metal foil film, the coating layer, the transparent substrate, and the like are the same as those described above.

In the present application, when the metal foil film has a thickness of 5 μm or less, a carrier layer may be introduced into the rear surface of the metal foil film for ease of handling. The carrier layer may be a copper foil or an aluminum foil.

In the present application, the forming of the coating layer having a refractive index of 1.450 to 1.485 on the metal foil film may be performed by a coating method using a composition comprising the above-described material for the coating layer and a solvent capable of dissolving the material, and the coating method may use comma coating, gravure coating, slot die coating, and the like. The solvent is not particularly limited as long as the solvent is a material capable of dissolving a material for a coating layer, and for example, it is possible to use methanol, ethanol, isopropanol, methyl ethyl ketone, NMP, a cellosolve-based material, a mixture thereof, and the like.

In the present application, the forming of the transparent substrate on the coating layer may be performed by a heat lamination process at about 60° C. to 120° C. which is equal to or more than the softening point of the coating layer. In this case, a carrier film may be attached to the transparent substrate for the purpose of protecting the process, preventing incorporation of impurities, and the like.

In the present application, the forming of the metal foil pattern by patterning the metal foil film may use a typical resist patterning process known in the art. That is, after a resist pattern is formed on a metal foil film, the metal foil pattern may be formed through an etching process.

The method for manufacturing a heating film according to an exemplary embodiment of the present application may further comprise: forming a protective layer on the coating layer and the metal foil pattern after forming the metal foil pattern and/or forming a protective layer on a surface of the transparent substrate opposite to a surface on which the coating layer is provided.

The automotive heating glass according to an exemplary embodiment of the present application comprises: the heating film; a first glass provided on one surface of the heating film; and a second glass provided on the other surface of the heating film, in which at least one surface of a surface between the heating film and the first glass and a surface between the heating film and the second glass comprises a second laminated film.

The second laminated film is not particularly limited, and a laminated film known in the art may be applied. More specifically, the second laminated film may comprise polyvinyl butyral (PVB), ethylene vinyl acetate (EVA), polyurethane (PU), polyolefin (PO), and the like, but the material is not limited thereto. In particular, it is preferred that the second laminated film comprises polyvinyl butyral (PVB).

In the present application, the first glass and the second glass are not particularly limited, and glass known in the art may be applied.

In the present application, the automotive heating glass may have a haze of 0.3% to 2%.

Another exemplary embodiment of the present application further comprises a pair of opposing bus bars for applying electricity to the metal foil pattern.

According to still another exemplary embodiment of the present application, a black pattern may be provided to hide the bus bar. For example, the black pattern may be printed by using a paste containing cobalt oxide. In this case, screen printing is suitable as a printing method, and the thickness may be set to 10 μm to 100 μm. The metal pattern and the bus bar may be each formed before or after the black pattern is formed.

The automotive heating glass according to the present application may be connected to a power source for heat generation, and in this case, it is preferred that the amount of heat generated is 100 W to 1,000 W per m$^2$, and preferably 200 W to 700 W per m$^2$. For the automotive heating glass according to the present application, a heating element has excellent heating performance even at low voltage, for example, 30 V or less, and preferably 20 V or less.

The automotive heating glass according to an exemplary embodiment of the present application is schematically illustrated in the following FIG. 8.

According to an exemplary embodiment of the present application, a metal foil film is patterned after a coating layer is formed by using the metal foil film as a substrate without forming a metal pattern by an expensive deposition process as in the related art, so that a heating film may be manufactured at a low cost.

Further, an automotive heating glass according to an exemplary embodiment of the present application may minimize a difference between refractive indices of a laminated film provided on both surfaces of a heating film and a coating layer provided to be brought into contact with a metal foil pattern, so that image distortion caused by the heating glass may be minimized.

In addition, for the automotive heating glass according to an exemplary embodiment of the present application, the reflectance of at least one surface thereof is low, so that the metal foil pattern may not be easily recognized.

MODE FOR INVENTION

Hereinafter, exemplary embodiments described in the present specification will be exemplified through Examples. However, the scope of the exemplary embodiments is not intended to be limited by the following Examples.

EXAMPLES

Example 1

Copper-foil matt surfaces having a thickness of 3 μm and 8 μm were coated with a coating solution having a composition of 12 parts by weight of PVB having a refractive index of 1.47 and a glass transition temperature (Tg) of 32° C., 44 parts by weight of ethanol, and 44 parts by weight of methyl ethyl ketone, and then dried at 120° C. for 10 minutes, thereby forming PVB layers having a thickness of 5 μm to 7 μm on the copper-foil matt surface. In this case, an Rz of the matt surface of the 3-μm copper foil was 1.5 μm, and an Rz of the matt surface of the 8-μm copper foil was 1.63 μm. Meanwhile, with respect to the 3-μm copper foil, an average reflectance of the matt surfaces measured at a wavelength of 380 nm to 780 nm was 7.6%.

Thereafter, a substrate was manufactured by laminating a PET having a thickness of 50 μm on the copper-foil PVB surface at 80° C. and a rate of 4 mpm. In the case of the copper foil having a thickness of 3 μm, since a carrier foil having a thickness of 18 μm was attached to the rear surface of the copper foil for ease of handling of the film process, the carrier foil was removed before a pattern was formed. Thereafter, the copper foil was cleaned with 0.5 wt % sulfuric acid/washed/dried, and then a dry film resist (DFR) having a thickness of 10 μm was laminated to 110 μm on the copper surface. Thereafter, a heating film was manufactured by subjecting the laminate to photolithography, development, etching, and stripping processes. In this case, a 0.4 wt % aqueous calcium carbonate solution was used as a developing solution, a 20 wt % iron chloride-based aqueous solution was used as an etchant, and a 2% aqueous sodium hydroxide solution was used as a stripping solution.

Thereafter, a copper foil having a width of 1 cm/a thickness of 50 μm was provided at both ends of a pattern surface of a heating film, where electric current flows, a structure of glass/a PVB sheet/a heating film/a PVB sheet/glass was manufactured by stacking a PVB sheet having a thickness of 0.38 mm on both surfaces and glass having a thickness of 2.8 mm on the outermost surface, and then subjected to vacuum lamination at a temperature of 140° C. for 30 minutes, thereby manufacturing a heating laminated glass. Physical properties of the laminated glass are illustrated in the following FIG. 2.

Example 2

A copper-foil matt surface having a thickness of 3 μm was coated with a coating solution having a composition of 14 parts by weight of PVB having a refractive index of 1.47 and a glass transition temperature (Tg) of 32° C., 43 parts by weight of ethanol, and 43 parts by weight of methyl ethyl ketone, and then dried at 120° C. for 3 minutes, and then was subjected to heat lamination with PET having a thickness of 50 μm by a hot roll laminator at 110° C. after a PVB layer having a thickness of 5 μm to 7 μm was formed, thereby manufacturing a substrate. In this case, a surface roughness Rz of the matt surface of the 3-μm copper foil used was 1.5 μm, and an average reflectance measured at a wavelength of 380 nm to 780 nm was 6.7%. In the case of the copper foil having a thickness of 3 μm, since a carrier foil having a thickness of 18 μm was attached to the rear surface of the copper foil for ease of handling of the film process, the carrier foil was removed before a pattern was formed. A novolac resin-based resist pattern having a thickness of 100 nm to 400 nm was formed by a printing process, and then etched with a 5% sulfuric acid/5% hydrogen peroxide-based etchant, thereby manufacturing a heating film without a process of removing a resist.

Thereafter, a copper foil having a width of 1 cm/a thickness of 50 μm was provided at both ends of a pattern surface of a heating film, where electric current flows, a structure of glass/a PVB sheet/a heating film/a PVB sheet/ glass was manufactured by stacking a PVB sheet having a thickness of 0.38 mm on both surfaces and glass having a thickness of 2.8 mm on the outermost surface, and then subjected to vacuum lamination at a temperature of 140° C. for 30 minutes, thereby manufacturing a heating laminated glass. Physical properties of the laminated glass are illustrated in the following FIG. 3.

Example 3

For a copper foil having a thickness of 3 μm, in which a surface roughness of a matt surface was 1.5 μm and an average reflectance measured at a wavelength of 380 nm to 780 nm with respect to this surface was 6.7%, the matt surface of the copper foil having a thickness of 3 μm was coated with a coating solution having a composition of 14 parts by weight of PVB having a refractive index of 1.47 and a glass transition temperature (Tg) of 32° C., 43 parts by weight of ethanol, and 43 parts by weight of methyl ethyl ketone, and then dried at 120° C. for 3 minutes, thereby forming a PVB layer having a thickness of 5 μm to 7 μm. Thereafter, with respect to a film subjected to the PET lamination and processes of removing a carrier foil having a rear surface thickness of 18 μm in the same manner as in Example 2, forming a resist pattern, and etching copper, the resist was removed by a 3% aqueous NaOH solution, and then the copper surface exposed to the air was blackened by immersing the film in a selenium-based blackening solution for 30 seconds. In this case, in order to enhance adhesion force of the PET film with the PVB sheet and the PVB coating layer, a PET film (a thickness of 50 μm) in which a 2.5-nm NbOx layer was deposited on both surfaces of PET was used.

Thereafter, a structure of glass/a PVB sheet/a heating film/a PVB sheet/glass was manufactured by stacking a PVB sheet having a thickness of 0.38 mm on both surfaces of the heating film and glass on the outermost layer of the heating film, and then a heating laminated glass was manufactured by subjecting the structure to vacuum lamination at a temperature of 140° C. for 30 minutes. Physical properties of the laminated glass are illustrated in the following FIG. 4.

Comparative Example 1

By using a substrate in which an adhesive layer comprising a silicone-based polymer having a refractive index of 1.44 as a main component was formed between the PET and the copper foil, a heating film was manufactured through resist patterning, etching, and stripping processes. In this case, the copper foil after the carrier foil was removed had a thickness of 2 μm. With respect to the films when only the resist patterning and etching processes were performed and when the resist patterning, etching, and stripping processes were performed, light characteristics in each film state and light characteristics after glass was laminated are illustrated in the following FIG. 5.

When compared to the Examples, it could be seen that the PVB coating layer having a refractive index of 1.47 (Examples 1 to 3) had a haze of less than 2% after glass was laminated, whereas in the case of Comparative Example 1, in which the refractive index was 1.44, haze was 2% or more even after glass was laminated.

Comparative Example 2

After a matt surface of a copper foil having a surface roughness Rz of 2.0 μm and a thickness of 2 μm was coated with a coating solution having a composition of 20 parts by weight of PVB having a refractive index of 1.47 and a glass transition temperature (Tg) of 32° C. and 80 parts by weight of N-methylpyrrolidone, the copper foil was left to stand at room temperature overnight, and then a PVB layer having a thickness of 50 μm was formed on the copper foil by drying the copper foil at 80° C. for 10 minutes and at 110° C. for 3 minutes, or drying the copper foil at other different temperature profiles. In this case, when the copper foil was left to stand at room temperature overnight, and then dried at 80° C. for 10 minutes and at 110° C. for 3 minutes, the copper foil/the PVB substrate was very severely curled, so that it was difficult to perform lamination with PET. When the drying rate was increased, bubbles were observed after lamination with PET due to the solvent remaining in the substrate.

Comparative Example 3

A copper foil having a thickness of 6 μm was coated with a coating solution having a composition of 12 parts by weight of PVB sheet having a refractive index of 1.47 and a glass transition temperature (Tg) of 32° C., 44 parts by weight of ethanol, and 44 parts by weight of methyl ethyl ketone, and then dried at 120° C. for 4 minutes, thereby forming a PVB layer having a thickness of 5 μm to 7 μm. In this case, an Rz of the 6-μm copper foil used was 0.7 μm, and an average reflectance of the matt surface measured at a wavelength of 380 nm to 780 nm was 68%. In this case, even after PET having a thickness of 50 μm was subjected to heat lamination on a PVB surface of a copper foil at 120° C. and a rate of 17 mpm, adhesion force between the copper foil/PVB layer and the PET layer was not secured, so that additional aging was needed at 110° C. for 3 days in order to finally manufacture a substrate because it was impossible to perform the process.

Thereafter, a DFR having a thickness of 10 μm was subjected to heat lamination at 120° C. with the surface of the copper foil, and then a heating film was manufactured by subjecting the laminate to photolithography, development, etching, and stripping processes. In this case, a 1.7 wt % aqueous sodium carbonate solution was used as a developing solution, a 5% sulfuric acid/5% hydrogen peroxide-based aqueous solution was used as an etchant, and a 2.5% aqueous sodium hydroxide solution was used as a stripping solution. Thereafter, a structure of glass/a PVB sheet/a heating film/a PVB sheet/glass was manufactured by stacking a PVB sheet having a thickness of 0.38 mm on both surfaces of the heating film and glass having a thickness of 2.8 mm on the outermost layer of the heating film, and then a heating laminated glass was manufactured by subjecting the structure to vacuum lamination at a temperature of 140° C. for 30 minutes. In this case, the reflectance after the lamination was 15% to 17%, which was slightly high.

Comparative Example 4

A bonding layer comprising an epoxy-based polymer having a refractive index of 1.612 as a main component was formed between PET and a copper foil, and a substrate aged at 60° C. for a day was prepared. Through resist patterning, etching, and stripping processes, a heating film was manufactured. In this case, the copper foil after the carrier foil was removed had a thickness of 2 µm. Thereafter, a structure of glass/a PVB sheet/a heating film/a PVB sheet/glass was manufactured by stacking a PVB sheet having a thickness of 0.38 mm on both surfaces of the heating film and glass on the outermost layer of the heating film, and then a heating laminated glass was manufactured by subjecting the structure to vacuum lamination at a temperature of 120° C. for 20 minutes, and then vacuum lamination at a temperature of 140° C. for 20 minutes. The haze of the thus-manufactured heating laminated glass was 3.5%.

Comparative Example 5

A substrate in which a bonding layer comprising a urethane-based polymer having a refractive index of 1.492 as a main component formed between PET and a copper foil was prepared, and a heating film was manufactured through resist patterning, etching, and stripping processes. The copper foil had a thickness of 8 µm. In this case, when etching was performed by using an etchant composed of a mixed solution of phosphoric acid/nitric acid/acetic acid, the urethane-based polymer layer was damaged, so that patterning could not be performed. It was difficult to perform a stable patterning even when an etchant comprising sulfuric acid and hydrogen peroxide as main components was used, but a structure of glass/a PVB sheet/a heating film/a PVB sheet/ glass was manufactured by stacking a PVB sheet having a thickness of 0.38 mm on both surfaces of the heating film and glass on the outermost layer in some good regions, and then a heating laminated glass was manufactured by subjecting the structure to vacuum lamination at a temperature of 140° C. for 30 minutes. The haze of the thus-manufactured heating laminated glass was 2.6%.

In the present application, light characteristics on the transmission mode and light characteristics on the reflection mode were measured by COH-400 manufactured by Nippon Denshoku Co., Ltd., and Solidspec-3700 manufactured by Shimadzu Corporation, respectively, and in the reflective light characteristics, the case where the pattern surface was irradiated with light and the case where the PET surface was irradiated with light were designated as 'front' and 'rear', respectively. When voltage was applied, the terminal resistance was calculated from electric current flowing between both bus bars, and the sheet resistance was calculated by dividing the terminal resistance by the distance between the bus bars, and then multiplying the resulting value by the width of a region where electric current flows.

As in the result, according to an exemplary embodiment of the present application, a metal foil film is patterned after a coating layer is formed by using the metal foil film as a substrate without forming a metal pattern by an expensive deposition process as in the related art, so that a heating film may be manufactured at a low cost.

Further, an automotive heating glass according to an exemplary embodiment of the present application may minimize a difference between refractive indices of a laminated film provided on both surfaces of a heating film and a coating layer provided to be brought into contact with a metal foil pattern, so that image distortion caused by the heating glass may be minimized.

In addition, for the automotive heating glass according to an exemplary embodiment of the present application, the reflectance of at least one surface thereof is low, so that the metal foil pattern may not be easily recognized.

The invention claimed is:

1. A heating film comprising:
   a transparent substrate comprising an attachment enhancement layer on directly at least one surface of the transparent substrate;
   a coating layer provided on the transparent substrate and having a refractive index of 1.450 to 1.485;
   a metal foil pattern provided on the coating layer; and
   a blackening layer pattern on the metal foil pattern,
   wherein a ten-point average roughness (Rz) of a surface of the metal foil pattern, with the coating layer, is more than 0.9 µm,
   wherein the blackening layer pattern comprises selenium-based materials,
   wherein the transparent substrate comprises one or more materials selected from polyethylene terephthalate (PET), a cyclic olefin polymer (COP), polyethylene naphthalate (PEN), polyethersulfone (PES), polycarbonate (PC), and acetyl celluloid,
   wherein the transparent substrate has a thickness of 25 µm to 100 µm, and
   wherein the attachment enhancement layer comprises one or more oxides selected from the group consisting of NbO, $NbO_2$, $Nb_8O_{19}$, $Nb_{16}O_{38}$, $Nb_{12}O_{29}$, and $Nb_{47}O_{116}$,
   wherein a thickness of the attachment enhancement layer is 1 nm to 5 nm.

2. The heating film of claim 1, wherein a ten-point average roughness (Rz) of a surface of the coating layer opposite to a surface of the coating layer on which the transparent substrate is provided is more than 0.9 µm.

3. The heating film of claim 1, wherein the coating layer has a refractive index of 1.465 to 1.485.

4. The heating film of claim 1, wherein the coating layer has a thickness of 3 µm to 15 µm.

5. The heating film of claim 1, wherein the coating layer has a thickness of 3 µm to 7 µm.

6. The heating film of claim 1, wherein the coating layer has a thickness of 7 µm to 15 µm.

7. The heating film of claim 1, wherein the coating layer comprises one or more materials selected from polyvinyl butyral (PVB), ethylene vinyl acetate (EVA), and acrylate-based adhesive materials, and
   the coating layer has a glass transition temperature (Tg) of 25° C. to 80° C.

8. The heating film of claim 1, wherein the metal foil pattern has a height of 2 µm to 15 µm.

9. The heating film of claim 1, wherein the metal foil pattern comprises an aluminum foil pattern or a copper foil pattern.

10. The heating film of claim 1, wherein the metal foil pattern comprises an aluminum foil pattern or a copper foil pattern having an average reflectance of 15% or less at a wavelength of 380 nm to 780 nm.

11. The heating film of claim 1, wherein a metal portion of the metal foil pattern has an average reflectance of 67% or less at a wavelength of 380 nm to 780 nm.

12. The heating film of claim 1, wherein the metal foil pattern has a line width of 4 μm to 25 μm.

13. The heating film of claim 1, further comprising a protective layer on the coating layer and the metal foil pattern,
wherein a difference in refractive index between the coating layer and the protective layer is 0.030 or less.

14. The heating film of claim 13, wherein the protective layer has a thickness of 3 μm to 30 μm.

15. The heating film of claim 13, wherein the coating layer and the protective layer comprise the same material.

16. The heating film of claim 1, further comprising a first laminated film on a surface of the transparent substrate opposite to a surface of the transparent substrate on which the coating layer is provided,
wherein a difference in refractive index between the coating layer and the first laminated film is 0.030 or less.

17. The heating film of claim 16, wherein the coating layer and the first laminated film comprise the same material.

18. The heating film of claim 17, wherein the coating layer and the first laminated film comprise polyvinyl butyral (PVB).

19. A method for manufacturing a heating film, the method comprising:
forming a coating layer having a refractive index of 1.450 to 1.485 on a metal foil film;
forming a transparent substrate on a surface of the coating layer that is opposite to a surface of the coating layer on which the metal foil film is provided;
forming a metal foil pattern by patterning the metal foil film; and
forming a blackening layer pattern on the metal foil pattern,
wherein a ten-point average roughness (Rz) of a surface of the metal foil pattern, is more than 0.9 μm,
wherein the blackening layer pattern comprises selenium-based materials,
wherein the transparent substrate comprises one or more materials selected from polyethylene terephthalate (PET), a cyclic olefin polymer (COP), polyethylene naphthalate (PEN), polyethersulfone (PES), polycarbonate (PC), and acetyl celluloid,
wherein the transparent substrate has a thickness of 25 μm to 100 μm,
wherein the transparent substrate comprises an attachment enhancement layer directly on at least one surface of the transparent substrate; and
wherein the attachment enhancement layer comprises one or more oxides selected from the group consisting of $NbO$, $NbO_2$, $Nb_8O_{19}$, $Nb_{16}O_{38}$, $Nb_{12}O_{29}$, and $Nb_{47}O_{116}$,
wherein a thickness of the attachment enhancement layer is 1 nm to 5 nm.

20. The method of claim 19, wherein the forming of the transparent substrate on the coating layer is performed by subjecting the coating layer and the transparent substrate to a heat lamination process at 60° C. to 120° C.

21. An automotive heating glass comprising:
the heating film of claim 1;
a first glass provided on a first surface of the heating film; and
a second glass provided on a second surface of the heating film opposite to the first surface of the heating film,
wherein at least of the first and second surfaces of the heating film comprises a second laminated film.

22. The automotive heating glass of claim 21, wherein the second laminated film comprises one or more of polyvinyl butyral (PVB) and ethylene acetate (EVA).

* * * * *